3,092,626
PROCESS FOR THE MANUFACTURE OF 16-ALKYL-20:21-KETOLS OF THE PREGNANE SERIES
Albert Wettstein, Riehen, and Karl Heusler and Peter Wieland, Basel, Switzerland, assignors to Ciba Corporation, a corporation of Delaware
No Drawing. Filed July 10, 1961, Ser. No. 122,658
Claims priority, application Switzerland July 19, 1960
7 Claims. (Cl. 260—239.55)

The present invention provides a new process for the manufacture of 16α-alkyl-20:21-ketols of the pregnane series and of their esters from $\Delta^{16}$-20-oxo-pregnene-21-acid esters. These starting materials are easy to manufacture from 17-unsubstituted 16-ketones by a known process according to which the 16-ketone is condensed with an oxalic acid ester, the condensation product is acetylated to form the 20-enolacetate, advantageously after having converted the 21-ester function into an amido group, for example a morpholido group, and finally the keto group in position 16 is reduced to the hydroxyl group, either catalytically or with the aid of sodium borohydride. Alkaline hydrolysis and esterification yields the $\Delta^{16}$-20-oxo-pregnene-21-acid esters.

The new process is of special advantage in the manufacture of 18-substituted 16-alkyl-20:21-ketols of the pregnane series, since the appropriately substituted $\Delta^{16}$-20-oxo-pregnene-21-acid esters are easy to prepare, for example by total synthesis. By the present process there can be made from the $\Delta^{5:16}$-3-ethylenedioxy-11β:18-oxido-18 - tetrahydropyranyloxy - 20 - oxo-pregnadiene-21-acid methyl ester in a simple manner the highly active 16α-alkyl-aldosterones and their esters and ethers, more especially, for example, 16α-methyl-aldosterone, which is of great importance to the treatment of a disturbed mineral metabolism.

The present invention is based on the observation that 16α-alkyl-20:21-ketols of the pregnane series and their esters are obtained in a simple manner by reacting a $\Delta^{16}$-20-oxo-pregnene-21-acid ester in the presence of a cuprous halide with an alkyl-metal compound; the resulting $\Delta^{17}$-20-enolate-metal salt is reduced with a complex metal hydride, if desired after having esterified the enolic 20-hydroxyl group, in a non-hydroxylic solvent; the enol derivative is hydrolysed in 20-position to yield the free 20-ketone, and, if desired, the free hydroxyl group in position 21 is esterified and any ketal or acetal groups present are hydrolysed.

The reaction of the $\Delta^{16}$-20-oxo-21-carboxylic acid ester, used as starting material, with an alkyl-metal compound, more especially a methyl-metal compound such as methyl-magnesium iodide or bromide, is carried out in the presence of a cuprous halide, for example cuprous chloride, in a cyclic or open-chain ether, such as tetrahydrofuran, dioxane or diglycol dimethyl ether, whereby a 20-enolate salt of the 16α-alkyl, for example 16α-methyl, compound used is obtained. The latter salt can be mixed directly with a complex metal hydride or it may first be converted into a 20-enol derivative.

It is easy, for example, to esterify the 20-enolate by adding thereto a reactive derivative of a carboxylic acid, such as an anhydride or halide of such an acid. In this manner there are obtained, for example, the 20-acetates, 20-propionates, 20-benzoates, and others.

The reduction according to the invention of the 21-ester group with a complex metal hydride is advantageously carried out with a hydride capable of reducing ester groups in a non-hydroxylic solvent, for example with lithium aluminum hydride, lithium trimethoxy aluminum hydride, lithium borohydride, magnesium aluminum hydride, calcium borohydride or lithium gallium hydride.

Particularly suitable solvents are cyclic or open-chain ethers, such as tetrahydrofuran, dioxane, diethyl ether, glycol dimethyl ether or polyglycol dimethyl ether. In the course of the reduction the enolic 20-hydroxyl group esterified with a carboxylic acid is reconverted into a metal enolate salt, while the 21-ester group is reduced to the carbinol group.

The decomposition with water or with an acid yields directly the 20:21-ketol.

If desired, a resulting free 18- and/or 21-hydroxyl group can be esterified at any suitable stage of the process. This is accomplished with a reactive derivative of a saturated or unsaturated aliphatic, cycloaliphatic, aromatic, araliphatic or heterocyclic carboxylic acid, preferably of lower aliphatic, monocyclic cycloaliphatic, aromatic or heterocyclic carboxylic acid, lower monocyclic araliphatic or cycloaliphatic carboxylic acid, especially those having 1 to 20 carbon atoms, for example formic, acetic, trifluoroacetic, propionic acid, a butyric acid, a valeric acid such as n-valeric acid or trimethylacetic acid, a caproic acid such as β-trimethylpropionic acid, oenanthic, caprylic, pelargonic, capric acid, an undecylic acid, for example undecylenic acid, lauric, myristic, palmitic or stearic acids, for example oleic acid, cyclopentyl-, cyclohexyl- or phenylacetic or -propionic acids, benzoic acid, hexahydrobenzoic, furan-2-carboxylic acid, a nicotinic acid, a dicarboxylic acid such as oxalic, succinic or glutaric acid, a substituted carboxylic acid such as a β-ketocarboxylic acid, for example acetoacetic, propionyl-acetic, butyrylacetic or caprinoylacetic acid or of amino acids.

Any protective groups present, such as ketals or tetrahydropyranyl ethers, are then split by treatment with an acid, for example by being heated with dilute acetic acid.

In addition to the 16α-alkyl compounds, more especially 16α-methyl compounds, the crude products of the present process contain a certain proportion of the corresponding 16-unsubstituted compounds when the 1:4-addition of the methyl-metal compound was not complete. Thus it has been observed that during the reduction of the $\Delta^{16}$-20-oxo-pregnene-21-acid ester, used as starting material, with a complex metal hydride, above all with lithium aluminum hydride, this reducing agent may likewise be added on to the α:β-unsaturated 20-ketone in the 1:4-position so that, after simultaneous reduction of the 21-ester group, a 20-enolate-21-alcoholate salt is formed from which by hydrolysis a 16-unsubstituted 20-oxo-21-hydroxy compound is formed. In this manner there is thus directly obtained, for example from $\Delta^{5:16}$-3-ethylenedioxy-11β:18-oxido-18-tetrahydropyranyl-oxy-20-oxo-pregnadiene-21-acid ester, the aldosterone-21-monoacetate by treatment with lithium aluminum hydride, hydrolysis, acetylation and splitting off the ketal.

The present invention further provides compounds of the formula

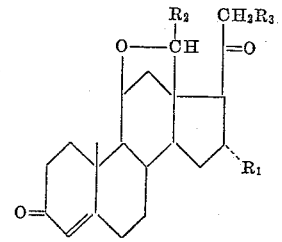

in which $R_1$ represents a lower alkyl, more especially a methyl group, and $R_2$ and $R_3$ each represents a free, esterified or etherified hydroxyl group—and the corresponding $\Delta^5$-3-ketals. In particular there may be mentioned 16α-methylaldosterone and its 21-monoesters and 18:21-diesters, such as its formates, acetates, propionates, benzoates, trimethylacetates, furoates, cyclopentylpropionates, as well as $\Delta^5$-3-ethylenedioxy-11$\beta$:18-oxido-16$\alpha$-methyl-18-tetrahydropyranyloxy - 20 - oxo - 21 - hydroxy-pregnene and its 21-esters, more especially the aforementioned esters.

The compounds of the present process are racemates or optically active substances. Racemates can be resolved into their antipodes in the usual way.

The present invention also includes any variant of the process in which only some of the process steps are carried out, if desired in a different order of succession, or the starting material is obtained as an intermediate at any stage of the process and the remaining step or steps is/are carried out.

The following examples illustrate the invention.

*Example 1*

A methyl magnesium iodide solution prepared from 51 mg. of magnesium and 5 cc. of ether is treated with 25 cc. of absolute tetrahydrofuran, and 10 cc. of the solvent are then distilled off. While cooling the reaction mixture with ice-water it is mixed first with 12.5 mg. of cuprous chloride and then with a solution of 515 mg. of D:L - $\Delta^{5,16}$ - 3 - ethylenedioxy - 11$\beta$:18 - oxido - 18-tetrahydropyranyloxy-20-oxo-pregnadiene-21-acid methyl ester in 5 cc. of tetrahydrofuran, then stirred for 2 hours under nitrogen at room temperature, treated with 1 cc. of a molar lithium aluminum hydride solution in tetrahydrofuran, and then stirred for another 2 hours. 1 cc. of ethyl acetate and 40 cc. of saturated Seignette salt solution are added, the whole is agitated three times with methylene chloride, and the organic solutions are washed with water, dried and evaporated under vacuum. The resulting crude $\Delta^5$ - 3 - ethylenedioxy - 11$\beta$:18 - oxido-16$\alpha$ - methyl - 18 - tetrahydropyranyloxy - 20 - oxo - 21-hydroxy-pregnene is mixed with 2 cc. of pyridine and 2 cc. of acetic anhydride and the whole is kept overnight, then evaporated in a water-jet vacuum, the residue is dissolved in xylene, the solution is evaporated in a water-jet vacuum, and this operation is repeated twice more. The residue, which contains $\Delta^5$-3-ethylenedioxy-11$\beta$:18 - oxido - 16$\alpha$ - methyl - 18 - tetrahydropyranyl-oxy-20-oxo-21-acetoxy-pregnene, is dissolved in 10 cc. of acetic acid of 90% strength and immersed for 10 minutes in a bath heated at 100° C., then cooled, evaporated in a water-jet vacuum, and the residue is dissolved in methylene chloride and washed twice with water. The aqueous solutions are once more extracted with methylene chloride, and the organic solutions are dried and evaporated under reduced pressure. The residue (424 mg.) is chromatographed on 140 sheets of paper in the system formamide-benzene, to yield a zone which absorbs in the ultra-violet spectrum and is positive to blue tetrazolium; the distance through which it migrates is exactly identical with that of D:L-aldosterone acetate. Immediately below it, there is a second zone which absorbs in the ultra-violet spectrum and reacts positive to blue tetrazolium, and which contains 16$\alpha$-methyl-aldosterone acetate. Both zones are cut out, shredded and separately pasted with 400 cc. of aqueous tetrahydrofuran of 20% strength, then suction-filtered. The filter residue is again pasted with 400 cc. of aqueous tetrahydrofuran of 20% strength, again suction-filtered, and this operation is repeated once more with 400 cc. of aqueous tetrahydrofuran of 20% strength and twice with 400 cc. of pure tetrahydrofuran on each occasion. The combined filtrates are concentrated in a water-jet vacuum at a bath temperature of 40–45° C. to 800 cc. and extracted 3 times with methylene chloride; the organic solutions are washed twice with water, dried, evaporated under vacuum, and the residue is dried for a short time at 60° C. in a high vacuum. From the upper zone there are obtained by recrystallization from a mixture of acetone and ether, with the aid of 20 mg. of carboraffin, 5 mg. of D:L-aldosterone acetate which gives no depression of the melting point in admixture with an authentic control product, and it displays an identical infra-red spectrum.

The extract from the lower zone is chromatographed on 2.5 grams of silica gel containing 15% of water. When the fractions eluted with a 4:1-mixture of benzene and ethyl acetate are recrystallized from a mixture of methylene chloride and ether, there are obtained 15 mg. of D:L-16$\alpha$-methyl-aldosterone acetate melting at 186–188° C. The infra-red spectrum in a methylene chloride solution reveals the following characteristic bands: 2.80$\mu$ (hydroxyl), 5.74$\mu$ with reflection at 5.80$\mu$ (acetate+20-ketone), 5.99$\mu$ and 6.19$\mu$ ($\Delta^4$-3-ketone) and 8.17$\mu$ (acetate).

When the crude product obtained by reduction with lithium aluminum hydride is esterified, instead of with acetic anhydride, with propionic anhydride, or with trimethylacetyl chloride, or with benzoyl chloride, or with cyclopentylpropionyl chloride, followed by working up in an identical manner as described above, there are obtained the 16$\alpha$-methyl-aldosterone-21-propionate, -21-trimethylacetate, -21-benzoate and -21-cyclopentylpropionate respectively.

*Example 2*

6.25 cc. of a solution of 1.25 grams of potassium bicarbonate in 25 cc. of water and 100 cc. of methanol are treated with 41.6 mg. of crude 16$\alpha$-methyl-aldosterone acetate. The mixture is stirred for 5 hours at room temperature, then treated with 1.2 cc. of 0.5 N-acetic acid, diluted with water, and the whole is extracted twice with methylene chloride. The organic solutions are washed once with dilute sodium chloride solution, dried and evaporated in a water-jet vacuum at a bath temperature of 40° C. The resulting amorphous residue is crude 16$\alpha$-methyl-aldosterone.

*Example 3*

0.15 cc. of a molar solution of lithium aluminum hydride in tetrahydrofuran is stirred into a solution of 51.5 mg. of D:L-$\Delta^{5,16}$-3-ethylenedioxy-11$\beta$:18-oxido-18-tetrahydropyranyloxy - 20 - oxo - pregnadiene - 21 - acid methyl ester in 1 cc. of tetrahydrofuran. The mixture is stirred for 2 hours at room temperature, and then mixed with 0.1 cc. of ethyl acetate and subsequently after 30 minutes with dilute Seignette salt solution, then extracted three times with methylene chloride. The organic solutions are washed twice with water, dried and evaporated in a water-jet vacuum. The residue is mixed with 2 cc. of pyridine and 2 cc. of acetic anhydride and kept overnight at room temperature, then evaporated in a water-jet vacuum, the residue is dissolved in xylene, the solution is evaporated in a water-jet vacuum, and this operation is repeated twice more. The residue is mixed with 5 cc. of acetic acid of 90% strength and immersed for 10 minutes in a bath heated at 100° C., allowed to cool and evaporated in a water-jet vacuum. The residue is dissolved in methylene chloride, washed twice with water, and the aqueous solutions are extracted once with methylene chloride. The organic solutions are dried and evaporated and the residue (45 mg.) is chromatographed on paper in the system formamide-benzene; the aldosterone acetate can be identified by a zone which absorbs in the ultra-violet spectrum and is positive to blue tetrazolium, and travels exactly the same distance as authentic aldosterone acetate. The compound can be isolated in crystalline form by the extraction operation described in Example 1.

What is claimed is:

1. Process for the manufacture of 16$\alpha$-alkyl-20:21-ketols of the pregnane series, wherein a $\Delta^{16}$-20-oxo-pregnene-21-acid ester is reacted in the presence of cuprous chloride with an alkyl-magnesium halide, the resulting $\Delta^{17}$-20-magnesium enolate is reduced with a complex light metal hydride in an ether solvent and the enol derivative in 20-position is hydrolysed to form the free 20-ketone.

2. Process according to claim 1, wherein the reduction with a complex light metal hydride is carried out after the esterification of the 20-enolic hydroxyl group.

3. Process according to claim 1, wherein the free hydroxyl group in 21-position is esterified.

4. Process according to claim 1, wherein any ketal or acetal groups present are hydrolysed.

5. Process according to claim 1, wherein a $\Delta^{16}$-20-oxo-pregnene-21-acid ester is reduced in a cyclic ether with a methyl-magnesium halide in the presence of cuprous chloride.

6. Process according to claim 1, wherein a $\Delta^{16}$-20-oxo-pregnene-21-acid ester is reacted in tetrahydrofuran with methyl-magnesium iodide in the presence of cuprous chloride.

7. Process according to claim 1, wherein the reduction is performed with lithium aluminum hydride.

References Cited in the file of this patent

UNITED STATES PATENTS

| | | |
|---|---|---|
| 2,982,767 | Kerwin et al. | May 2, 1961 |
| 2,994,694 | Wettstein et al. | Aug. 1, 1961 |

OTHER REFERENCES

Fieser et al.: Steroids, page 704 (1959), Reinhold Pub. Co., New York, N.Y.